Figure 1:
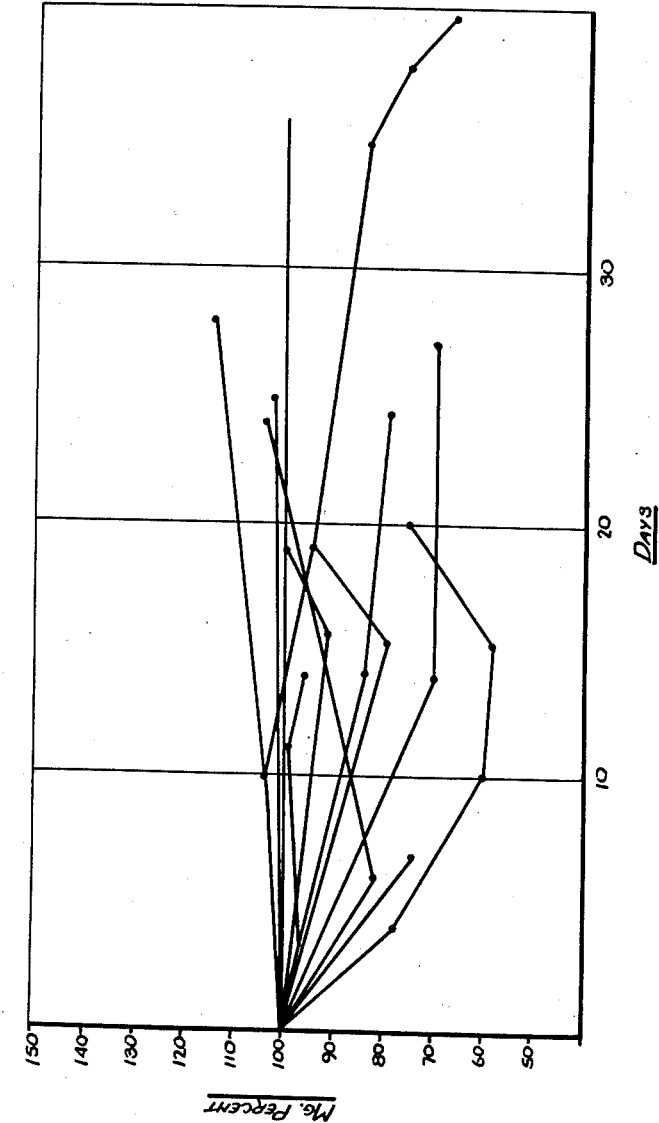

United States Patent Office 3,127,314
Patented Mar. 31, 1964

3,127,314
METHOD OF REDUCING HYPERLIPEMIA BY 11β,17β-DIHYDROXY 17α-ETHYNYL-Δ$^{1,4}$-ANDROSTADIENE-3-ONE
Bernard Goffinet, Paris, Georges Muller, Nogent, Marne, Cyrille Plotka, Drancy, Robert Jequier, Saint-Maur, and Leon Velluz, Paris, France, assignors, by mesne assignments, to Roussel-UCLAF, S.A., Paris, France, a corporation of France
Continuation of abandoned application Ser. No. 596,292, July 6, 1956, and application Ser. No. 716,525, Feb. 21, 1958. This application Jan. 18, 1960, Ser. No. 3,168
Claims priority, application France Jan. 13, 1956
1 Claim. (Cl. 167—65)

The present invention relates to highly effective antilipemic pharmaceutical preparations which may be used in the curative as well as preventive treatment of hyperlipemic diseases and to a method of reducing hyperlipemia in blood.

The present application is a continuing application of copending applications Serial No. 596,292, filed July 6, 1956 and entitled "New Derivatives of Δ$^1$-Dehydro Adreno-Sterone and Methods of Preparing Same" and Serial No. 716,525, filed February 21, 1958 and entitled "New Antilipemic Preparation, now both abandoned.

The antilipemic activity of a number of steroid compounds such as the estrogens, e.g. 3-methoxy 16β,17β-dihydroxy 16α-methyl estra 1,3,5(10)-trien, is known. However, all these compounds have disadvantages which prevent their therapeutical use, such as gynecomastia, impotence, and loss of libido observed in male patients and uterine bleeding in females. Gastrointestinal irritation is also frequently encountered on administration of estrogens. When attempting to eliminate these side-effects by simultaneous administration of androgens, normalization of the distribution of chloesterol in the serum lipoproteins is unfavorably affected. Attempts to modify the molecule of such estrogenic antilipemic agents, so as to eliminate the side-effects have proved to be rather unsuccessful.

It is one object of the present invention to provide new and highly valuable antilipemic compounds which are substantially free of the disadvantages of the known compounds and have proved to be highly effective in human therapy.

Another object of the present invention is to provide a composition useful in reducing hyperlipemia in the blood and, thus, in the treatment of atherosclerosis.

A further object of the present invention is to provide a simple and effective method of reducing hyperlipemia in the blood.

Still another object of the present invention is to provide a process of making such valuable, highly effective antilipemic agents.

Other objects and advantageous features of the present invention will become apparent as the description proceeds.

In principle the present invention comprises the use of 11β,17β-dihydroxy-17α-ethinyl-Δ$^{1,4}$-androstadiene-3-one as antilipemic agent. This compound corresponds to the following Formula I.

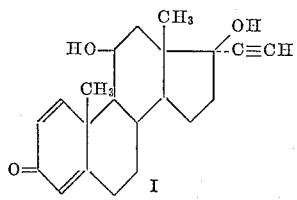

The compound is prepared by direct ethynylation of Δ$^{1,4}$-androstadiene-3,11,17-trione without protection of the 3-keto group. The resulting 17-ethynyl-Δ$^{1,4}$-androstadiene-17-ol-3,11-dione is converted into its 3-monosemicarbazone, which is reduced by a mixed hydride of boron and an alkali metal or an alkaline earth metal, such as the borohydrides of lithium, sodium, potassium, or calcium. Thereby, the 3-semicarbazone of 11β,17β-dihydroxy-17α-ethynyl-Δ$^{1,4}$-androstadiene-3-one is obtained which is converted, by treatment with pyruvic acid, into 11β,17β-dihydroxy-17α-ethynyl-Δ$^{1,4}$-androstadiene-3-one, the active antilipemic agent according to the present invention.

The starting material, the Δ$^{1,4}$-androstadiene-3,11,17-trione, is readily available by treating Δ$^1$-dehydrocortisone with sodium bismuthate according to Hershberg et al. (J. Am. Chem. Soc., 1955, 77, 4781–4784).

Acetylene is attached to Δ$^{1,4}$-androstadiene-3,11,7-trione according to known methods in the presence of alcoholates or amides of alkali metals or alkaline earth metals, such as potassium, lithium or calcium, in an inert solvent. It is also possible to carry out the process in the presence of liquid ammonia which, upon dissolving the alkali metals, produces their amides in situ. Upon completion of the reaction, the mixture is acidified and 11-keto-17α-ethynyl-Δ$^{1,4}$-androstadienolone is extracted by means of a solvent and purified by recrystallization. In order to produce the corresponding 11β-hydroxylated compound, the 3-monosemicarbazone of the 3,11-diketone is prepared and is reduced in a solvent, preferably in aqueous tetrahydrofuran.

The following examples are submitted to illustrate the invention without, however, limiting thereby the scope of the appended claims. The melting points are instantaneous melting points determined on the Maquenne block.

EXAMPLE 1

*Preparation of 11-Keto-17α-Ethynyl-Δ$^{1,4}$-Androstadiene-17β-Ol-3-One*

A solution of 2.35 g. of Δ$^1$-dehydroadrenosterone in 30 cc. of dioxane is saturated with acetylene; to this solution there are added 12 cc. of a solution obtained from 9.5 g. of potassium metal, 120 cc. of tertiary amyl alcohol, and 30 cc. of benzene. This addition produces a bright, brick-red color and causes formation of a reddish-brown precipitate. Purified acetylene is passed through the mixture for 2½ hours, whereupon 10 cc. of 50% acetic acid are added. The solution turns pale yellow. Prepitation is accomplished by adding 300 cc. of water and extraction is carried out with chloroform. The chloroform layer is washed with water, dried over magnesium sulfate and filtered. The chloroform extract is treated with charcoal and is evaporated to dryness. The residue is treated with ether, filtered and washed with a very small amount of ice-cold alcohol and then with ether. After drying, 1.64 g. of an almost pure product of a very pale yellow color, having a melting point of 250–252° C. are obtained. In order to purify this product, it is dissolved in 40 cc. of absolute alcohol, the solution is concentrated to 5 cc., and the concentrated solution is permitted to crystallize. After drying, washing the residue with ice-cold alcohol, and again drying, there are obtained 1.23 g. of the pure product, having a melting point of 253° C., and an optical rotation $$[\alpha]_D^{20} = +80° \pm 2°$$

(concentration 1% in dioxane). The compound is solvated, it contains 0.7% of alcohol which it losses when heated to 135° C. It is soluble in 25 parts by volume of hot alcohol, in acetone, fairly well soluble in chloroform, almost insoluble in ether, and insoluble in water and in dilute aqueous acids and alkalis.

Analysis.—$C_{21}H_{24}O_3$; molecular weight: 324. Calculated: 77.75% C; 7.45% H. Found: 77.6% C; 7.4% H.

Upon heating to 200° C., this compound sublimates into colorless needles.

EXAMPLE 2

*Preparation of 11β-Hydroxy-17α-Ethynyl-$\Delta^{1,4}$-Androstadiene-17β-Ol-3-One*

1 g. of said 11-keto-17α-ethynyl-$\Delta^{1,4}$-androstadiene-17β-ol-3-one, having a melting point of 252° C., is heated at 60° C. with 60 cc. of a solution of 5% semicarbazide acetate in 90% alcohol for 14 hours. After cooling, the precipitate is filtered, the residue is washed with cold alcohol, and dried. About 1 g. of the 3-semicarbazone is obtained which is sufficiently pure for the subsequent reduction step.

0.90 g. of said semicarbazone are dissolved in a mixture of 20 cc. of tetrahydrofuran and 2 cc. of water. The solution is cooled to 5° C., and 2 g. of potassium boronhydride dissolved in 10 cc. of water are added. Two layers form rapidly. The mixture is heated to 45° C. for 4½ hours while stirring vigorously, is neutralized by adding 10 cc. of 50% acetic acid, and is concentrated in a vacuum at a temperature below 50° C. A product separates which is gummy when hot and becomes pulverulent upon cooling. After washing with water and drying, 0.9 g. of a pale beige powder are obtained, constituting the crude semicarbazone, which is directly hydrolyzed to 11β-hydroxy-17α-ethynyl-$\Delta^{1,4}$-androstadiene-17β-ol-3-one by heating to 90° C. for 1½ hours with 6 cc. of 50% pyruvic acid. Complete dissolution takes place and the reaction mixture is poured into an aqueous solution of sodium bicarbonate in order to neutralize the pyruvic acid. After filtering, washing with water, drying, dissolving in 2 cc. of methanol, filtering hot, and concentrating to about one fifth of the original volume, 11β-hydroxy - 17α - ethynyl - $\Delta^{1,4}$ - androstadiene - 17β - ol - 3-one is obtained, which crystallizes in big prisms of a very pale yellow color and has a melting point of 280° C. It sublimates from 250° C. on in colorless needles. It is soluble in methanol, insoluble in water, ether, and benzene. It can, moreover, be identified by its U.V. spectrum (λ max. 244 mµ; ε=13.080). The infra-red spectrum shows that the keto group in 11-position has disappeared while the 1,4-diene ketone function remains.

It has been found that the above mentioned compound, given per os, causes clearing of the blood plasma in experimetal hyperlipemia. Said unexpected clarifying effect renders the compound suitable for clinical administration. It is administered orally in the form of tablets, sugar coated pills, powders, solutions, emulsions, suspensions, or other known preparations. It is preferably utilized in the form of an extemporaneous dilution which allows the action to be better distributed and more economical.

When given in powder form in capsules, homogeneous dispersion of the active compound in the excipient is obtained either by intimately mixing and grinding the same with the solid diluting agent or by moistening and impregnating the pulverized excipient with a solution of the antilipemic product and subsequent drying.

For tablets, sugar-coated pills and other solid forms of preparation, conventional solubilizing, binding, lubricating, disintegrating agents and other adjuvants may be used such as sugar, lactose, sorbitol, talc, starch, pectin, gelatin, gum arabic, methyl cellulose, carboxy methyl cellulose, yeast extracts, agar, calcium sulfate, calcium carbonate, kaolin, stearic acid, magnesium stearate, etc. The content of the active compound in such preparations may vary. Preferably the preparation should not contain less than 0.5% of the antilipemic agent. The optimum dose may vary between 5% and 60% by weight of the preparation.

According to the present invention, the antilipemic agent is preferably administered to humans in daily doses varying between 10 mg. and 200 mg. per day.

It is, of course, also possible to add the antilipemic material to the food, and especially to the fats used in preparing meals.

The present invention comprises also the inclusion, in the above mentioned preparations, of other drugs the administering of which jointly with the antilipemic principle, may appear desirable.

EXAMPLE 3

*Preparation of Tablets*

1000 g. of 11β,17β-dihydroxy-17α-ethynyl-$\Delta^{1,4}$-androstadiene-3-one are thoroughly mixed with 500 g. of sugar, 2950 g. lactose, and 500 g. fecula, moistened with water, and stirred so as to obtain a solid paste, which is granulated. The resulting granules are dried in a drying oven, ground and, after the addition of 50 g. of magnesium stearate, are compressed to tablets, each weighing 500 mg. and containing 100 mg. of the active compound.

EXAMPLE 4

*Preparation of Tablets*

5000 g. of 11β,17β-dihydroxy-17α-ethynyl-$\Delta^{1,4}$-androstadiene-3-one, 4000 g. sugar, 11,600 g. lactose, and 4000 g. of fecula are thoroughly mixed, moistened with water, and stirred to yield a solid paste, which is granulated. The resulting granules obtained are dried in a drying oven, ground and, after the addition of 400 g. of magnesium stearate, are compressed to tablets each weighing 100 mg. and containing 20 mg. of the active compound.

EXAMPLE 5

*Preparation of a Solution*

5 g. of 11β,17β-dihydroxy-17α-ethynyl-$\Delta^{1,4}$-androstadiene-3-one are introduced into a mixture of 50 cc. of benzyl alcohol and 30 cc. of pure anhydrous alcohol. The mixture is heated gently to cause dissolution. The solution is made up to a volume of 1000 cc. by the addition of pure peanut oil. The resulting solution is filled into ampoules.

EXAMPLE 6

*Pharmacological Test on Dogs*

Dogs, each weighing about 9 kg. and fasting for 12 hours, are given 10 g./kg. of cream to which a solution of 11β,17β - dihydroxy-17α-ethynyl-$\Delta^{1,4}$-androstadiene-3-one prepared according to Example 5, had been admixed in the proportion of 20 cc. of solution for 100 g. of cream. The dose thus is 10 mg./kg. of the active compound. At the same time, a control group of dogs are given the same amount of cream, to which the same quantity of the solvent as in Example 5, but without the active compound, had been added.

Blood samples were taken before giving the cream and 3, 5, and 7 hours thereafter. The turbidity of the blood plasma was measured. The values found and those determined in the corresponding Kunkel test are given in the following Tables I and II.

TABLE I.—BLOOD PLASMA TURBIDITY

| Time in hours | Untreated (10 dogs) | Treated (10 dogs) |
| --- | --- | --- |
| 0 | 0.36 | 0.34 |
| 3 | 1.68 | 0.91 |
| 5 | 2.20 | 0.85 |
| 7 | 1.35 | 0.61 |

TABLE II.—TURBIDITY IN THE KUNKEL TEST

| Time in hours | Untreated (10 dogs) | Treated (10 dogs) |
|---|---|---|
| 0 | 2.40 | 2.70 |
| 3 | 2.53 | 2.12 |
| 5 | 2.68 | 2.12 |
| 7 | 2.62 | 1.72 |

The same tests were carried out with dogs fasting for 24 hours. The values found are given in the following Table III.

TABLE III.—BLOOD PLASMA TURBIDITY

| Time in hours | Untreated (10 dogs) | Treated (10 dogs) |
|---|---|---|
| 0 | 0.29 | 0.32 |
| 3 | 1.29 | 0.83 |
| 5 | 1.33 | 0.65 |
| 7 | 1.41 | 0.58 |

*Pharmacological Test on Rabbits*

(a) *Preparation of a lipoprotein solution.*—The yolk of two eggs is diluted by the same volume of M/15 phosphate buffer solution at pH 8. The mixture is intimately mixed at 11,000 r.p.m. for 2 minutes and is then centrifuged at 6,000 r.p.m. for 20 minutes. The supernatant liquid (46 cc.) is separated and diluted with 138 cc. of M/15 phosphate buffer solution at pH 8.

(b) *Test on rabbits.*—10 cc./kg. of the lipoprotein solution prepared as described under (a) and 10 mg./kg. of the condensation product of formaldehyde, p-iso-octylphenol ether, and polyethylene glycol, sold by Winthrop under the trademark Triton W.R. 1339, dissolved in 0.1 cc. of distilled water, are slowly injected intravenously into two groups of rabbits each weighing about 3 kg. 15 minutes thereafter, a dose of the solution of $11\beta,17\beta$-dihydroxy-$17\alpha$-ethynyl-$\Delta^{1,4}$-androstadiene-3-one, prepared according to Example 5 and corresponding to 5 mg. of the active compound per kg. of treated animal, is introduced by means of a tube into the stomach of the animals of the first group, whereas the second group, which is the control group, is given the equivalent quantity of the solvent of Example 5, but without active compound.

Blood samples were taken on administration of the active compound and 15 minutes, 2 hours, 4 hours, 6 hours, and 24 hours later the turbidity of the blood plasma was measured. The values found are given in the following Table IV.

TABLE IV.—BLOOD PLASMA TURBIDITY

| Time in hours | Untreated (5 Rabbits) | Treated (5 Rabbits) |
|---|---|---|
| 0 | 0.46 | 0.42 |
| ¼ | 2.70 | 2.73 |
| 2 | 2.40 | 1.74 |
| 4 | 2.16 | 1.38 |
| 6 | 2.14 | 0.94 |

It is evident that the $11\beta,17\beta$-dihydroxy-$17\alpha$-ethynyl-$\Delta^{1,4}$-androstadiene-3-one is a highly effective anti-lipemic agent.

The above described pharmacological results were confirmed by tests on humans. For this purpose the total cholesterol as well as the cholesterol distribution in the $\alpha$-lipoprotein fraction and the $\beta$-lipoprotein fraction were determined. For the determination of the total cholesterol content of the blood plasma, the Liberman-Burchardt method was used while the lipoprotein fractions were analyzed after precipitation of the $\beta$-lipoprotein fraction by means of calcium chloride dextrane sulfate according to the method of Burstein.

Figure 2:
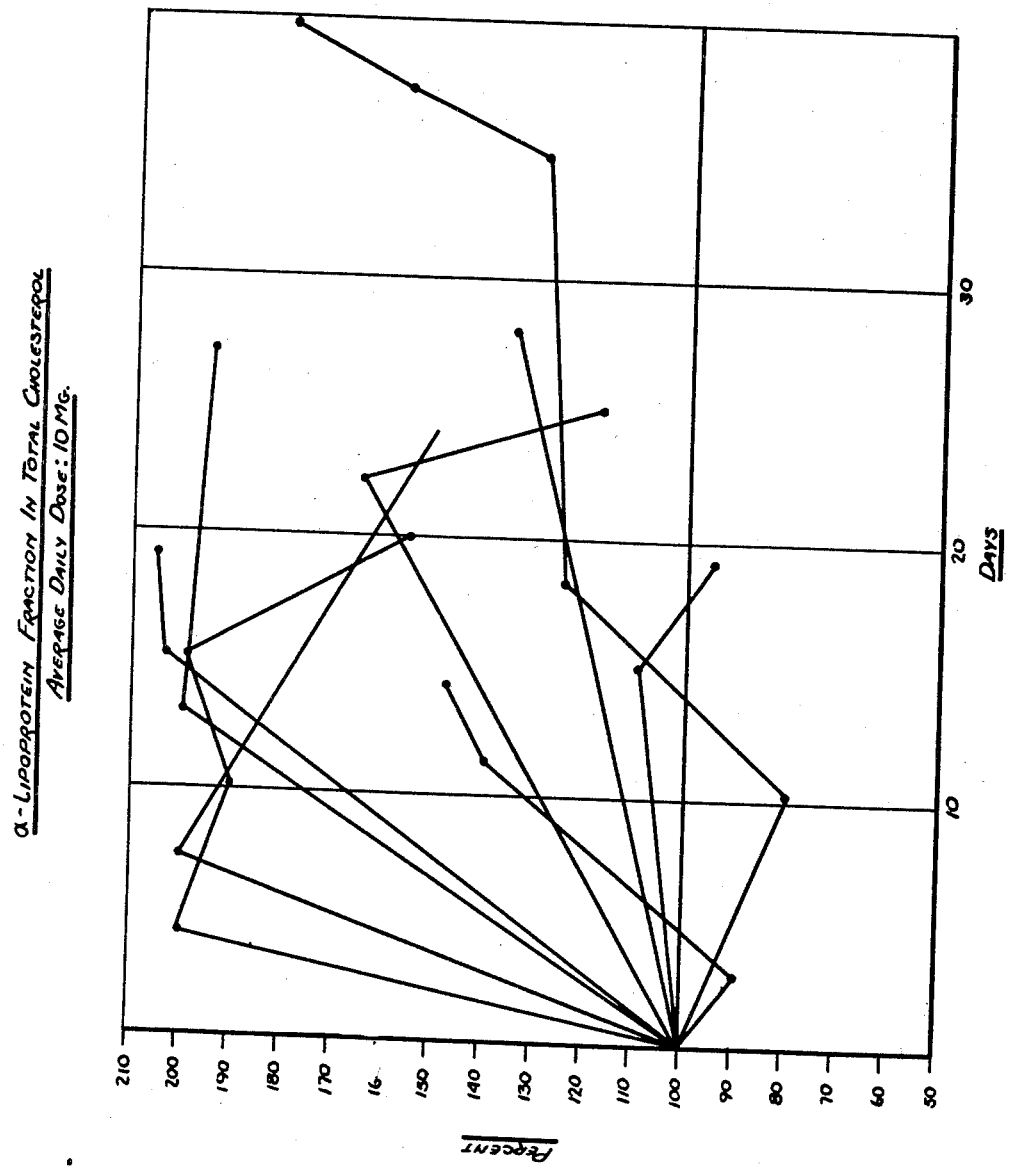
Figure 3:
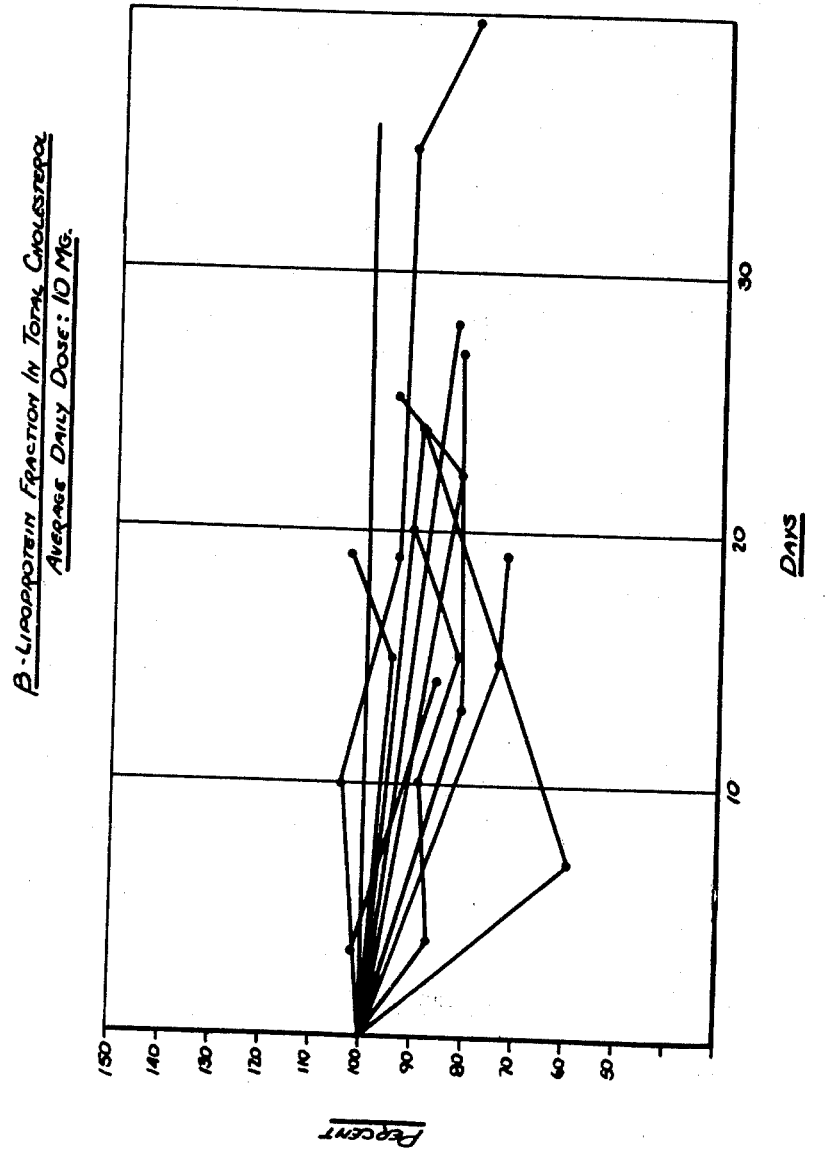

The curves of FIGURES 1, 2 and 3 of the drawings illustrate the results obtained in these tests.

The total cholesterol content is given in mg. percent and the distribution of the total cholesterol between the $\alpha$-lipoprotein fraction and the $\beta$-lipoprotein fraction is expressed in percent.

The curves were drawn:

(FIGURE 1) by taking the initial cholesterol content as equal to 100, (FIGURE 2) by taking the initial percent of cholesterol in the $\alpha$-lipoprotein fraction as equal to 100, (FIGURE 3) by taking the initial percent of cholesterol in the $\beta$-lipoprotein fraction as equal to 100.

This manner of presenting the results, not only eliminates some inaccuracies in the data but allows also to arrange the values of all patients at an initial starting point. Starting from point 100, a horizontal line has been drawn. This line allows proper visualization of all variations. The curves of FIGURES 1, 2 and 3 represent the cholesterol content of the blood plasma under treatment illustrated as a function of time.

It is evident from these curves that an average dose of 10 mg. per day of the antilipemic compound causes a lowering of the total cholesterol content. The amount of cholesterol in the $\beta$-lipoprotein fraction was reduced while the amount of cholesterol in the $\alpha$-lipoprotein fraction was increased sharply.

These curves clearly prove that in 6 patients out of 10 the total cholesterol content was reduced under treatment by more than 20% while in 2 other patients a reduction of about 10% was observed and only 2 patients did not show any appreciable effect.

The preceding examples are illustrative of the invention. They are not however to be construed as limiting the same. It is obvious that other expedients known to those skilled in the art may be employed which come within the spirit of the invention and the scope of the appended claim.

We claim:

The process of reducing hyperlipemia in the blood of humans and warm-blooded animals, said process comprising administering orally to humans and warm-blooded animals a composition containing as antilipemic agent, $11\beta,17\beta$-dihydroxy-$17\alpha$-ethynyl-$\Delta^{1,4}$-androstadiene-3-one in a daily dose between about 10 mg. and about 200 mg.

References Cited in the file of this patent

UNITED STATES PATENTS

| | | |
|---|---|---|
| 2,731,479 | Marshall | Jan. 17, 1956 |
| 2,793,217 | Muller | May 21, 1957 |
| 2,837,464 | Nobile | June 3, 1958 |
| 2,853,501 | Noehn | Sept. 23, 1958 |
| 2,894,960 | Warnant | July 14, 1959 |
| 2,902,498 | Fried | Sept. 1, 1959 |
| 2,905,676 | Colton | Sept. 22, 1959 |
| 2,906,759 | Muller | Sept. 29, 1959 |

FOREIGN PATENTS

| | | |
|---|---|---|
| 788,895 | Great Britain | Jan. 8, 1958 |
| 1,085,464 | France | July 28, 1954 |

OTHER REFERENCES

Sondheimer: JACS, vol. 77, November 5, 1955, pp. 5673–5676, (pp. 5675 and 5676 especially).

Wendler: JACS, vol. 73, August 1951, pp. 3818–3820.

Herzog: JACS, Sept. 20, 1955, pp. 4781–4784, vol. 77.